United States Patent
Langguth et al.

(10) Patent No.: US 6,382,701 B1
(45) Date of Patent: May 7, 2002

(54) DRIVE DEVICE FOR A SWIVELLING COMPONENT

(75) Inventors: Martin Langguth, Krailling; Thomas Schütt, Fürstenfeldbruck, both of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/650,815

(22) Filed: Aug. 30, 2000

(30) Foreign Application Priority Data

Aug. 30, 1999 (DE) ........................................ 199 41 207

(51) Int. Cl.$^7$ .................................................. B60J 7/00
(52) U.S. Cl. .................. 296/107.01; 296/117; 296/223; 296/96.15; 74/500.5
(58) Field of Search .............................. 296/96.15, 112, 296/115, 117, 107.01, 223; 74/500.5, 501.6

(56) References Cited

U.S. PATENT DOCUMENTS

| | | | | |
|---|---|---|---|---|
| 4,132,284 A | * | 1/1979 | Tomecek ...................... 74/513 |
| 4,409,861 A | * | 10/1983 | Sakurai ........................ 74/501 |
| 4,788,881 A | * | 12/1988 | Owen et al. ............... 74/500.5 |
| 4,995,667 A | * | 2/1991 | Tamura et al. .............. 296/223 |
| 5,015,030 A | * | 5/1991 | Detloff ........................ 296/223 |
| 5,067,768 A | * | 11/1991 | Fischbach .................... 296/117 |
| 5,109,968 A | * | 5/1992 | Pollitt et al. ................... 192/84 |
| 5,203,605 A | * | 4/1993 | Grimm et al. ............... 296/223 |
| 5,381,706 A | * | 1/1995 | Yanusko et al. ........... 74/500.5 |
| 5,426,995 A | * | 6/1995 | Maennle ..................... 74/500.5 |
| 5,520,432 A | * | 5/1996 | Gmeiner et al. ............ 296/117 |
| 5,645,309 A | * | 7/1997 | Graf ............................ 296/117 |
| 6,047,614 A | * | 4/2000 | Beugelsdyk et al. ....... 74/500.5 |

FOREIGN PATENT DOCUMENTS

| DE | G 91 08 341.9 | 11/1991 |
|---|---|---|
| DE | 41 24 869 | 2/1993 |

* cited by examiner

*Primary Examiner*—Ken Patel
(74) *Attorney, Agent, or Firm*—Nixon Peabody LLP; David S. Safran

(57) ABSTRACT

A drive device for a swivelling component that is pivotally mounted, for example, on a motor vehicle. The swivelling component is connected to a drive via a coupler which can be swivelled by the drive. The coupler having a connector which is connected via a connecting rod to the swivelling component. The connector can be driven by the drive and is movably supported along a guideway. To achieve uniform transfer of motion the guideway is a curved guide rail that is circular with the center of the circle lying on the axis of rotation of the swivelling component or is a three-dimensional curve.

13 Claims, 7 Drawing Sheets

DRIVE DEVICE FOR A SWIVELLING COMPONENT

BACKGROUND OF THE INVENTION

1. Field of the Invention

The invention relates to a drive device for a swivelling component which is pivotally mounted preferably on a motor vehicle. The swivelling component is connected to the drive via a coupler which can be swivelled by the drive. The coupler has a connector that is connected via a connecting rod to the swivelling component. The connector can be driven by the drive and is movably supported along a guideway.

2. Description of Related Art

Actuating the swivelling components on a motor vehicle, such as for example the swivel bearing of a folding convertible top, via a hydraulic drive with a hydraulic cylinder and via an electric drive with toothed gearing, is known. These drive devices, however, are characterized by a complex design, high cost, large required installation space and/or by loud motor noise in the electric motor which is located in the vicinity of the vehicle passengers. Moreover, the lever arm changes during the swivelling motion so that the transmitted drive torque varies, and the swivel angle is ordinarily structurally limited to less than 180° in a hydraulic drive.

SUMMARY OF THE INVENTION

The object of the invention is to devise the initially named drive device with a simplified structure and improved mode of operation.

This object is achieved in the initially mentioned drive device with a guideway that is a circular arc-shaped guide rail with the center of the circle lying on the axis of rotation of the swivelling component or being formed as a three-dimensional curve. Thus, in this drive device, as a result of the uniform distance of each point on the guideway to the swivel axis, uniform drive motion is converted into uniform motion of the swivel component. Thus, a complicated transmission mechanism for the drive motion is unnecessary.

The drive force and the drive motion will be routed via the connector to the guideway which can be supported to move on the guideway or is movably held by another component which forces it to follow the guideway.

In one preferred embodiment the coupler contains a drive cable which is routed in a tube to the guideway and is connected to the connector. The drive cable enables arrangement of the drive motor both near the swivelling component or the guideway and also away from it, and, thus, offers additional installation positions in the motor vehicle which are largely independent of the position of the swivelling component. Thus, the audible operating noise of the drive motor can be reduced by an insulated position and/or a position which is away from the passengers, as is known of the drive motors of sliding roofs which are accommodated away from the actuating mechanism of a cover to be opened on a front cross member or in the trunk. The drive cable which is guided in the tube can transmit both tensile and also compressive force and can be guided on largely any path in the body. The drive cable can be guided to two swivelling components which can be actuated in synchronism or two drive cables are synchronously driven by means of a rack.

Due to its bending capacity the drive cable can also follow curved guideways. A section of the drive cable which runs beyond the guideway can be connected to other components and thus can execute additional motion functions. The drive device, thus, contains only a few components and can be housed within a small installation space in the motor vehicle.

Since the circular arc-shaped guide rail has a constant radial distance to the axis of rotation of the swivelling component over the swivelling path and also a drive cable follows this guideway, the drive force and the drive motion of the drive cable are transmitted uniformly to the swivelling component. Angles of rotation up to roughly 360° can be accomplished with the circular arc-shaped guide rail.

One alternative configuration calls for the guideway to be formed as a three-dimensional curve which deviates from a plane circular arc guide. Thus, largely any transfers of motion on the drive device can be carried out, and also additional functions of the drive cable can be controlled which, for example, can be executed by coupling the components on the three-dimensional path of motion of the guideway. Feasibly, the connecting rod is then pivotally mounted on the swivelling component around a swivel axis which is roughly perpendicular to the swivel axis of the swivelling component in order to follow the three-dimensional curve when the drive motion is transmitted to the swivelling component. In doing so, it can be advantageous if the connecting rod is variable in length and can be matched to the changing distance between the axis of rotation of the swivel component and the connector on the guideway of the three-dimensional curve.

Feasibly, the swivelling component and the guideway or guide rail are supported on a vehicle-mounted main bearing so that a compact unit is formed.

Preferably, the connector is a cable linkage which is held in the guide rail in a guide channel for the drive cable, reaches to the outside through a lengthwise slot and is connected to the connecting rod. For mutual matching it is feasible for the cable connecting part to be matched to the curvature of the guide rail.

In order to prevent pinching of the drive device, the circular arc-shaped guide rail can be supported with play on the main bearing, or the play can be balanced on the linkage to the swivelling component. The play is fixed such that when a part which is moved by the swivelling component, for example the folding convertible top twists the radial distance from the axis of rotation of the swivelling component to the cable linkage remains essentially constant.

It can be provided that additional actuation by the drive device can be done. An end section of the drive cable with a component to be actuated can be connected for additional actuation.

The drive can be an electric motor or several series connected electric motors. But fundamentally also hydraulic or pneumatic motors which act for example on a sliding element in the guide rail are also suitable.

The drive device can be coupled to a windshield wiper, especially the rear windshield wiper of a motor vehicle. In one preferred application, it is coupled to a folding convertible top. The swivelling component being the main column of a parallelogram-like four-bar mechanism for swivelled support of the rod assembly of the folding top, and the four-bar mechanism contains the main column and a main connecting rod which, on the one hand, are pivotally mounted on the body-mounted main bearing and, on the other hand, on a lateral roof rod of the rod assembly of the top. For synchronous drive of the right-side and left-side main column it is then a good idea if the drive cable at the same time drives the two swivelling components or the main columns.

These and further objects, features and advantages of the present invention will become apparent from the following description when taken in connection with the accompanying drawings which, for purposes of illustration only, show several embodiments in accordance with the present invention.

DETAILED DESCRIPTION OF PREFERRED EMBODIMENTS

Figure 1:
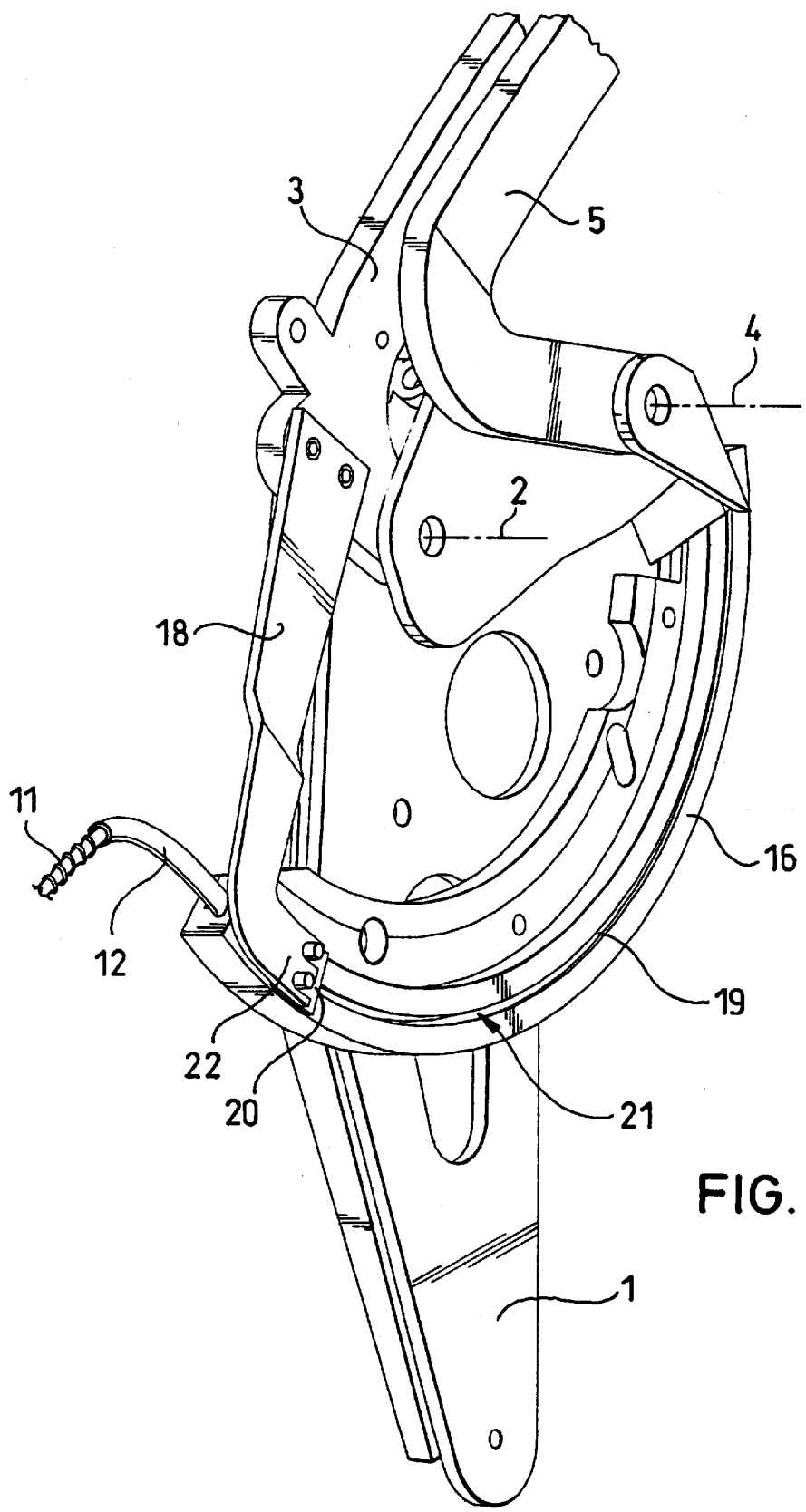
FIG. 1 is a perspective view of one embodiment of the drive device in a first movement position.
Figure 2:
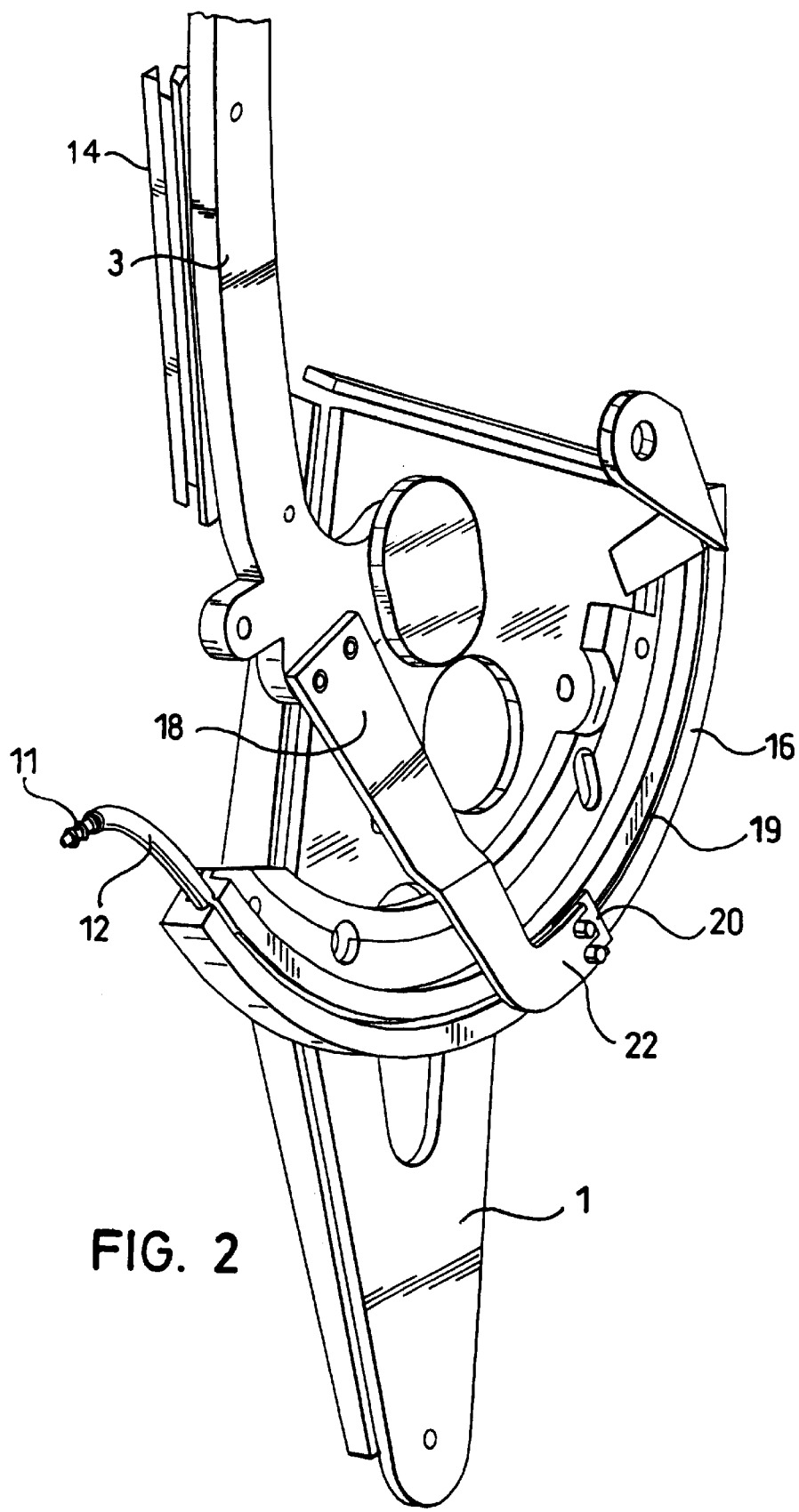
FIG. 2 is another perspective view of another embodiment of the drive device for a windshield wiper shown in a second movement position.
Figure 3:
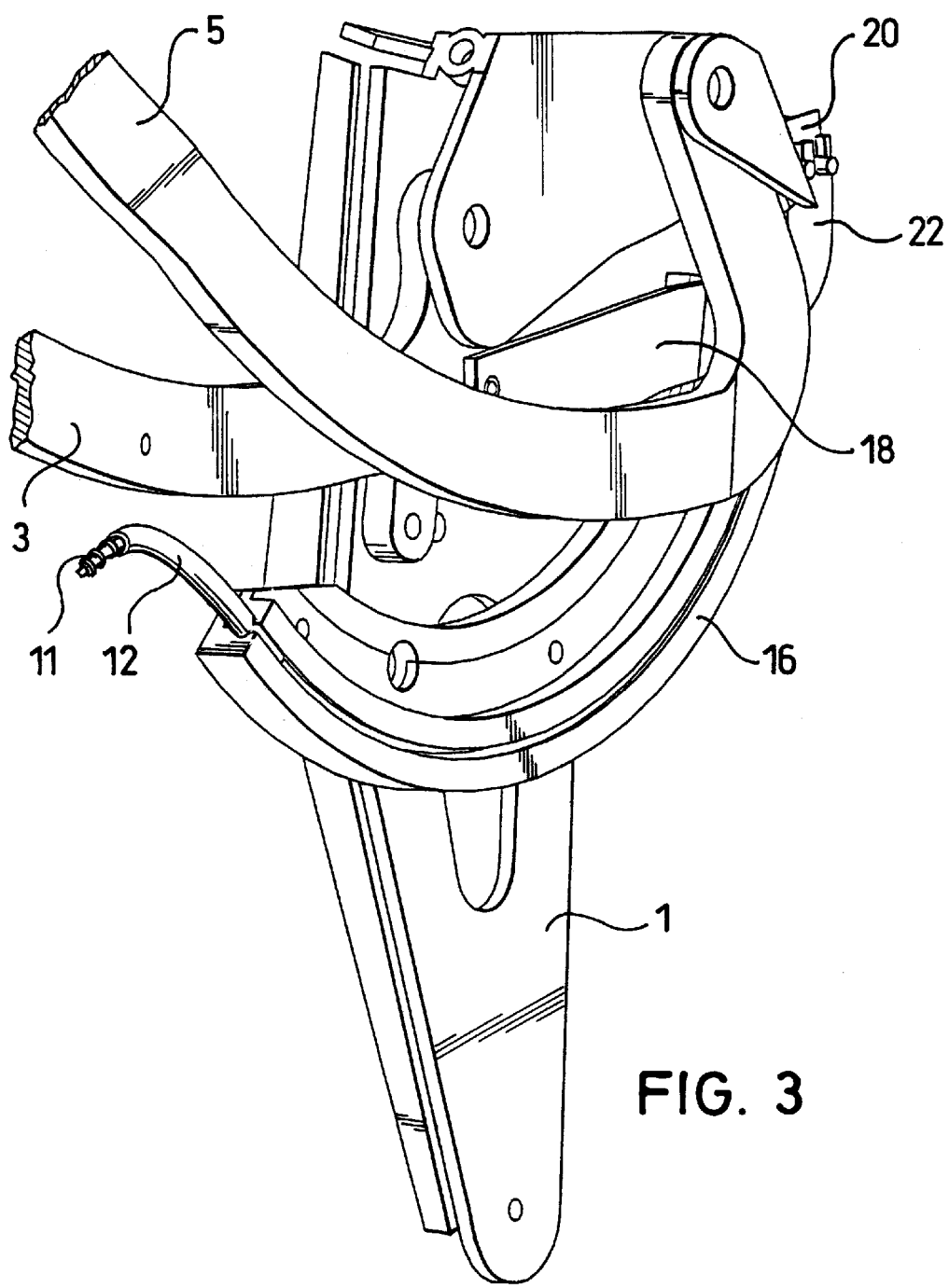
FIG. 3 is another perspective view of the embodiment of the drive device of FIG. 1 in a third movement position.
Figure 7:
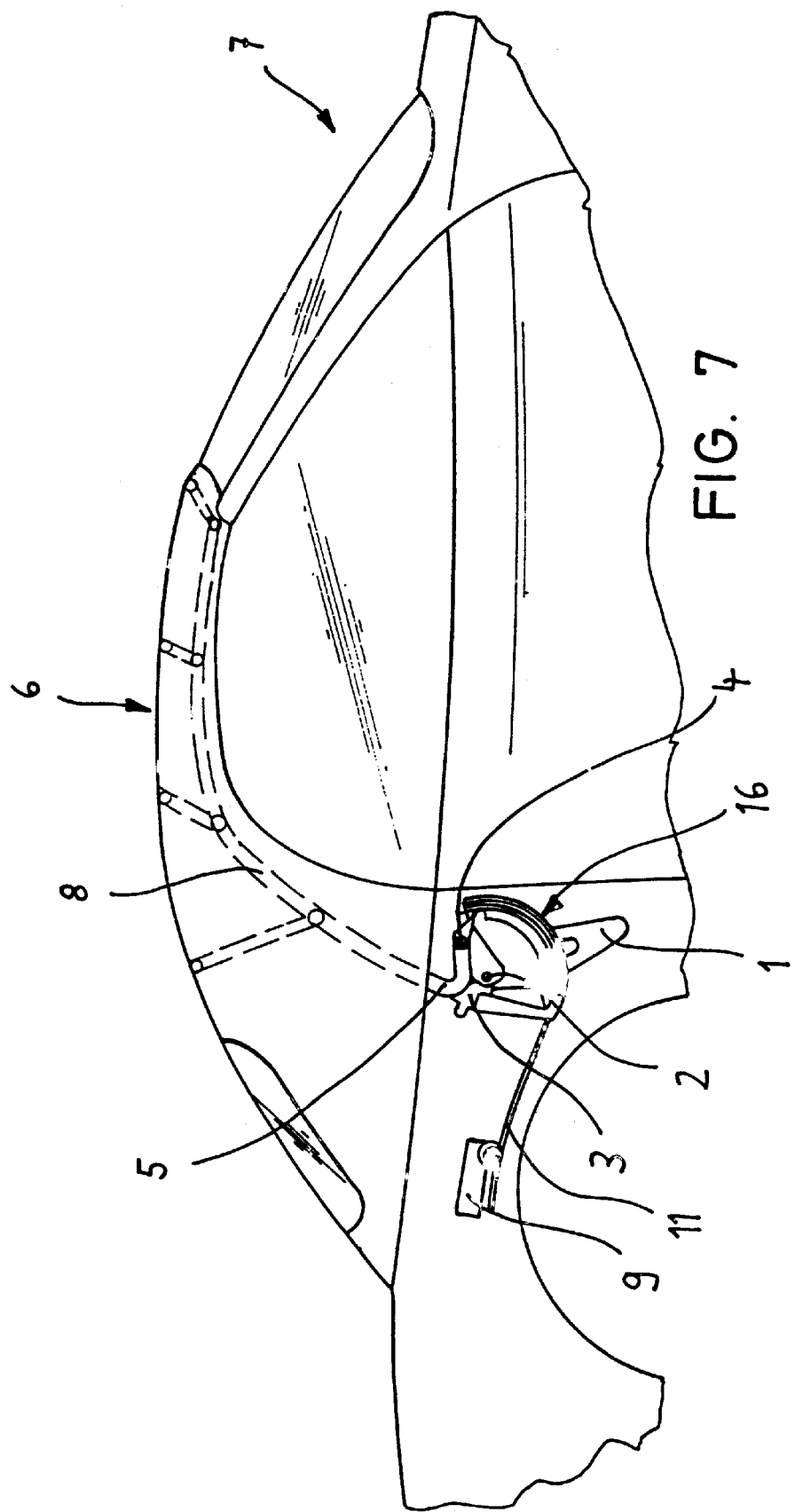
FIG. 7 is a side view of a convertible with a folding top and the drive device in accordance with the present invention.

A swivelling motion mechanism of a folding top 6 of a convertible 7 with a drive device in accordance with the present invention contains (see especially FIGS. 1 and 7) a main bearing 1, which is securely mounted on the vehicle and which represents a carrier component or a carrier plate, a main column 3, which is pivotally mounted on the main bearing 1 around an axis of rotation 2 as a swivelling component which can be driven and which can swivel, and a main connecting rod 5, which is pivotally mounted on the main bearing 1 around an axis of rotation 4. The main column 3 and the main connecting rod 5 on their respectively opposite ends are coupled to a roof rod 8, which is shown only schematically in FIG. 7, with a swivelling capacity, and with it form a parallelogram-like four-bar mechanism.

The drive device has a guideway shown as guide rail 16 which is a circular arc segment and which is attached on the main bearing 1 such that the center of its circular arc lies on the swivel axis 2 of the main column swiveling component 3.

A connection rod 18 is securely attached to the main column swiveling component 3 and extends over the guide rail 16 which has a side lengthwise slot 19. A coupler mechanism includes a connector shown as cable linkage 20 which is attached to a drive cable 11 and is held in a guide channel 21 for the drive cable 11, and which reaches through the lengthwise slot 19 to the outside and is connected to the free end 22 of the connecting rod 18. The drive cable 11 runs from a drive motor 9, for example an electric motor, through a hose-like jacket or a tube 12 to the cable linkage 20.

When the drive cable 11 is pushed by the drive motor 9 into the guide rail 16, the cable linkage 20 entrains the free end 22 of the connecting rod 18 which in turn swivels the main column 3 around the axis of rotation 2. Since the free end 22 moves along the circular arc-shaped guide rail 16 and the drive cable 11 likewise follows the circular path in the guide rail 16, by the constant radial distance from the cable linkage 20 to the axis of rotation 2 uniform transfer of the drive motion to the swiveling motion of the main column is ensured without a change of torque. Here the radius of the circular path transfers high torque to the connecting 18 and, thus, to the main column swiveling component 3. In this way, a relatively heavy component can be advantageously moved with a relatively weak electric motor.

The guide rail 16 can be attached to the main bearing 1 such that it can move, especially radially and/or parallel to the axis of rotation 2, by a small amount. Thus, when the folding top and the main column 3 twist, it can be matched to the swivelling motion of the connecting rod 18, thus, preventing pinching of the cable linkage 20 in the guide rail 16. On the other hand, matching can also be undertaken by the cable linkage 20 itself having a flexible support on the free end 22 of the connecting rod 18.

To relieve the weight for the folding top 6, there can be a gas spring between the main column 3 or the main connecting rod 5 and the body-mounted part. As is known of sliding roof drives, the electric motor 9 with a rack preferably synchronously drives two drive cables 11. If the drive device is used for example to produce a swivelling motion of a convertible top, the drive cables synchronously drive the swivelling levers (main column 3) of both sides of the folding top. In known hydraulically actuated folding tops, the synchronism of the two swivelling levers, which are each driven by its own hydraulic cylinder, dictates some additional cost in terms of control engineering.

Figure 4:
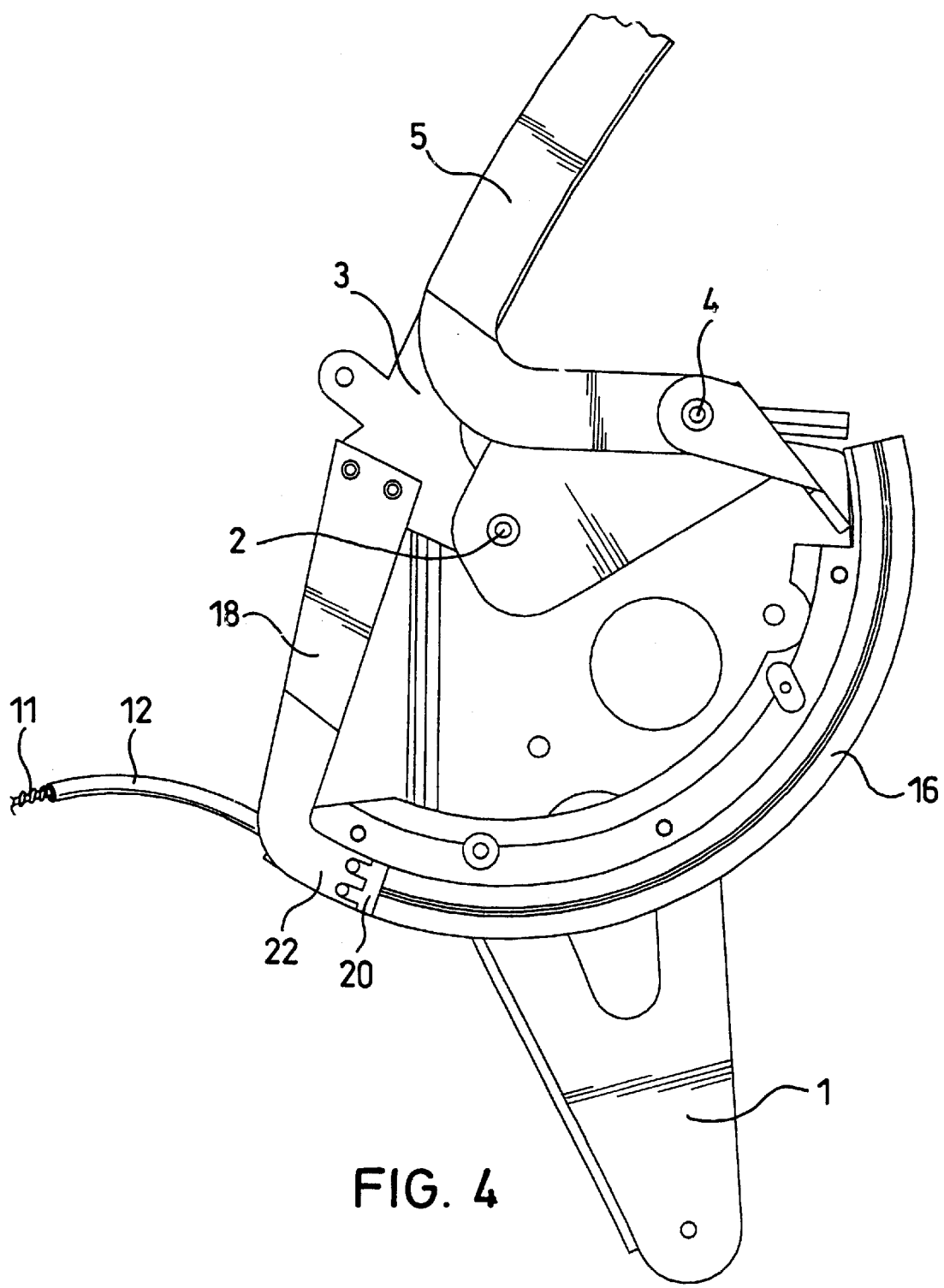
FIG. 4 is a side view of a second embodiment in its first movement position.
Figure 5:
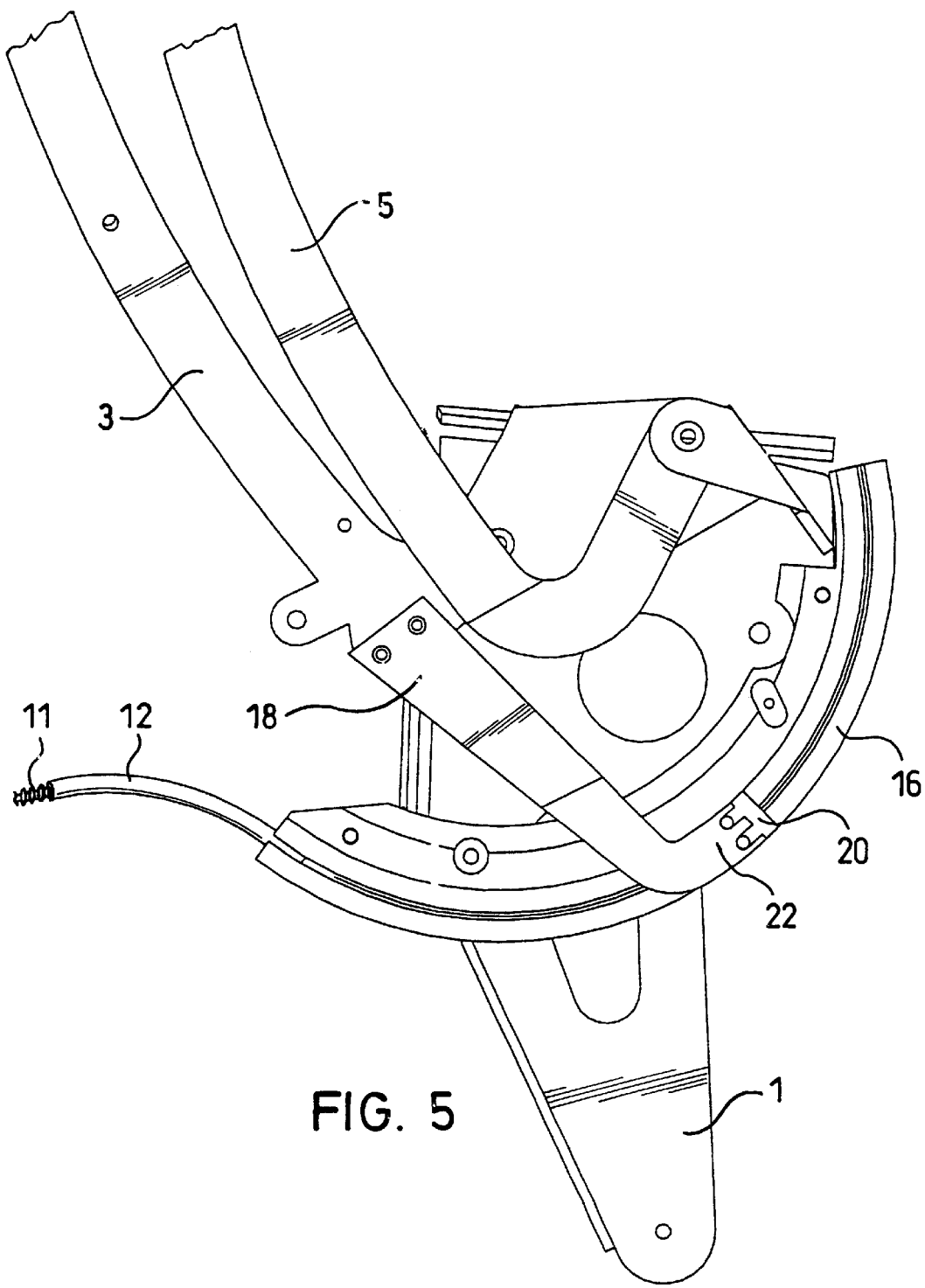
FIG. 5 is a side view of the embodiment of the drive device of FIG. 1 in its second movement position.
Figure 6:
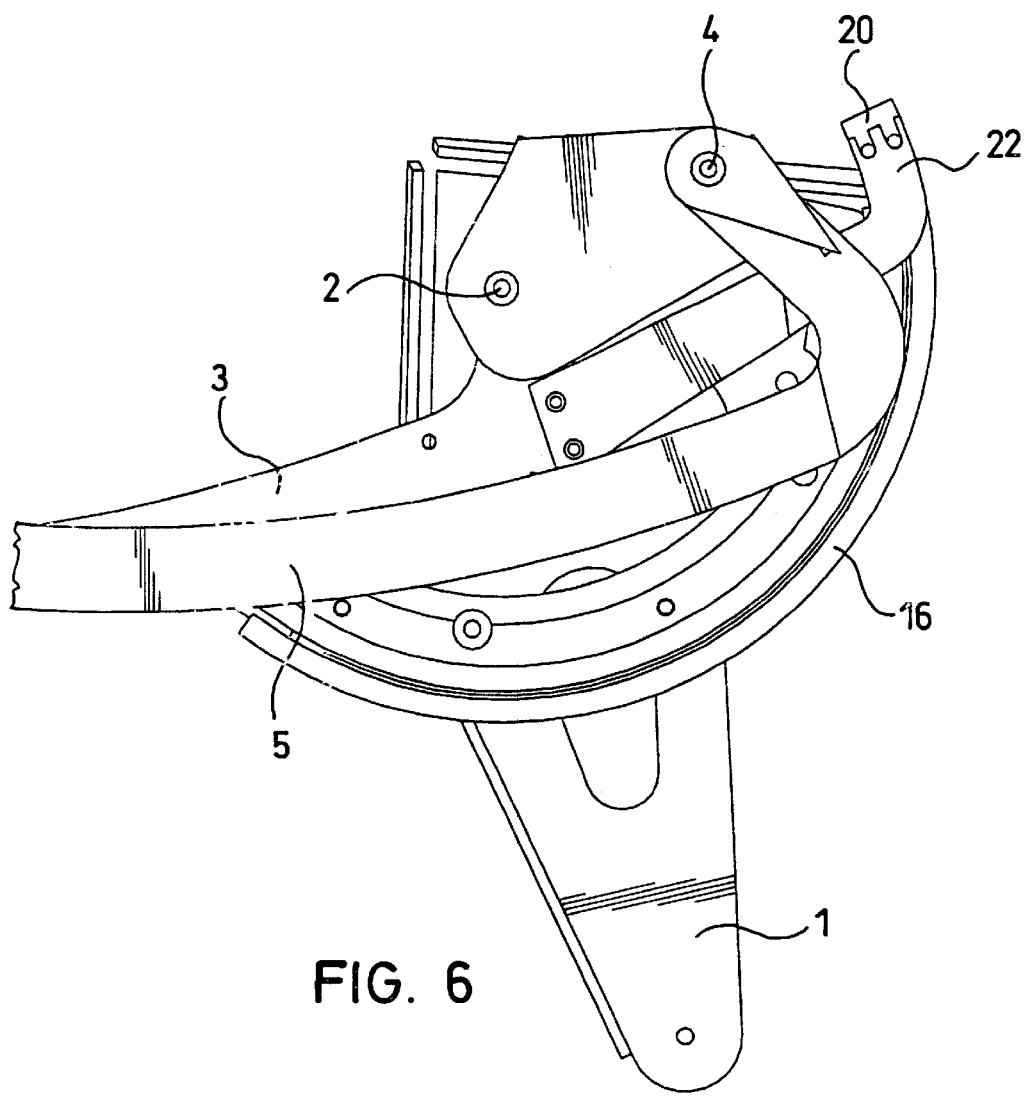
FIG. 6 is a side view of the embodiment of the drive device of FIG. 1 in its third movement position.

According to one embodiment, the connecting rod 18 can have a hinge 23 which is shown schematically in FIG. 4, so that it is pivotally mounted on the main column 3 around a swivel axis 24 which is roughly perpendicular to the axis of rotation 2 of the main column 3. In the transmission of the drive motion to the main column 3 the connecting rod 18 can thus follow the guide rail 16 which is a three-dimensional curve (not shown).

Here it can be feasible if the connecting rod 18 is variable in its length and can be adapted to a changing distance between the axis of rotation 2 of the main column 3 and the cable linkage 20 which is guided on the guide rails 16 which are matched to a three-dimensional curve. The connecting rod 18 may contain, for example, two parts which can be moved in the lengthwise direction against one another and, thus, can be telescoped (not shown).

Even if above only one embodiment for a convertible top of a motor vehicle was described, the invention can be used to advantage in many types of swivelling parts, for example in garage door drives, drum tipping devices of concrete mixers, any type of flaps such a windows, ventilation covers or the like.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications.

What is claimed is:

1. A drive device for a swiveling component that is pivotally mounted, said drive device comprising:

a drive;

a connecting rod connected to said swiveling component;

a coupler mechanism including a connector which connects said drive to said connecting rod;

a guideway including a curved guide rail that guides said connector, wherein said curved guide rail forms a circular arc in a plane and wherein the center of said guide rail coincides with the axis of rotation of said swiveling component.

2. The device of claim 1, wherein said coupler further includes a drive cable that is routed from said drive through a tube to said guideway and wherein said drive cable is connected to said connector.

3. The device of claim 2, wherein said drive cable is adapted to be connected to an additional component to be driven.

4. The device of claim 2, further comprising a second swiveling component and wherein both swiveling components are driven by said drive cable.

5. The device of claim 1, wherein said connecting rod is pivotally mounted on said swiveling component about a swivel axis that is roughly perpendicular to the axis of rotation of said swiveling component.

6. The device of claim 1, wherein said connecting rod has a variable length.

7. The device of claim 1, further comprising a vehicle-mounted main bearing that supports said guideway and said swiveling component.

8. The device of claim 7, wherein said guideway is supported with play on said main bearing.

9. The device of claim 1, wherein said connector is a cable linkage that extends through a lengthwise slot in said guide rail to connect to said connecting rod.

10. The device of claim 9, wherein said cable linkage is matched to the curvature of said guide rail.

11. The device of claim 1, wherein said drive includes at least one electric motor.

12. The drive device of claim 1, wherein said swiveling component is a windshield wiper mechanism.

13. A drive device for a swiveling component that is pivotally mounted, said drive device comprising:
  a drive;
  a connecting rod connected to said swiveling component;
  a coupler mechanism including a connector which connects said drive to said connecting rod;
  a guideway including a curved guide rail that guides said connector, wherein said curved guide rail forms a circular arc in a plane and wherein the center of said guide rail coincides with the axis of rotation of said swiveling component, wherein said swiveling component is a folding top of a convertible,
  wherein said connecting rod is connected to a main column that forms a portion of a parallelogram-like four-bar mechanism of said folding top and wherein said main column and said connecting rod are each pivotally mounted on a body-mounted main bearing and each are also connected to a lateral roof rod.

\* \* \* \* \*